United States Patent
Barak et al.

(10) Patent No.: US 9,369,450 B1
(45) Date of Patent: Jun. 14, 2016

(54) METHODS PRESERVING USER IDENTITIES DURING LOGIN AND RELATED SYSTEMS, DEVICES, AND MACHINES

(71) Applicant: CA, Inc., Islandia, NY (US)

(72) Inventors: Nir Barak, Karmi Yosef (IL); Amir Jerbi, Givatayim (IL); Stefano Sali, Milan (IT); Gabriel Kalmar, Raanana (IL)

(73) Assignee: CA, Inc., New York, NY (US)

( * ) Notice: Subject to any disclaimer, the term of this patent is extended or adjusted under 35 U.S.C. 154(b) by 48 days.

(21) Appl. No.: 14/135,062

(22) Filed: Dec. 19, 2013

(51) Int. Cl.
*H04L 29/06* (2006.01)

(52) U.S. Cl.
CPC ............... *H04L 63/08* (2013.01); *H04L 63/04* (2013.01); *H04L 63/1425* (2013.01)

(58) Field of Classification Search
CPC ........ G06F 21/30; H04L 9/32; H04L 63/1425
See application file for complete search history.

(56) References Cited

U.S. PATENT DOCUMENTS

| | | | | |
|---|---|---|---|---|
| 5,764,889 A | * | 6/1998 | Ault et al. | 726/17 |
| 2006/0258417 A1 | * | 11/2006 | Crawford | A63F 13/12 463/1 |
| 2011/0252459 A1 | * | 10/2011 | Walsh et al. | 726/4 |
| 2011/0276697 A1 | * | 11/2011 | Baratakke et al. | 709/227 |
| 2013/0191631 A1 | * | 7/2013 | Ylonen | H04L 63/1483 713/153 |
| 2014/0298419 A1 | * | 10/2014 | Boubez | H04L 63/08 726/4 |

OTHER PUBLICATIONS

Tolliver et al., "Use of SSH on a Compartmented Mode Workstation", 1997, 8 pages.*
Sobirey et al., "The Intrusion Detection System AID—Architecture, and experiences in automated audit analysis", 1996, pp. 278-290.*

* cited by examiner

*Primary Examiner* — Taghi Arani
*Assistant Examiner* — Thaddeus Plecha
(74) *Attorney, Agent, or Firm* — Myers Bigel & Sibley, P.A.

(57) ABSTRACT

A method of accepting a remote access at a target machine from a source machine may include receiving a login request at the target machine from the source machine, wherein the login request includes a user identification for the target machine. Responsive to accepting the login request, a session may be provided between the source and target machines using the user identification for the target machine. In addition, a user identification for the source machine may be received, and the user identification for the source machine may be locked at the target machine so that the user identification for the source machine is associated with target machine actions relating to the session between the source and target machines. For example, the user identification for the source machine may be received as an environment variable.

25 Claims, 5 Drawing Sheets

METHODS PRESERVING USER IDENTITIES DURING LOGIN AND RELATED SYSTEMS, DEVICES, AND MACHINES

BACKGROUND

The present disclosure relates to data processing machines and/or systems, and more specifically, to data processing machines, systems, operations, and/or methods relating to login.

In known data processing systems, a source processing machine (also referred to as a client processing machine and/or a source/client processing machine) may be coupled to a target processing machine (also referred to as a server processing machine and/or a target/server processing machine) over a network, and a user of the source/client processing machine may remotely access (log on to) the target/server processing machine through the source/client processing machine. More particularly, a session between the source/client and target/server processing machines may be initiated using a login program whereby the user of the source/client processing machine remotely logs on the target/service processing machine. If the user of the source/client processing machine changes his/her identification after logging on to the source/client processing machine, however, known processing machines may allow reference to the original user identification only when the identification change is done on the same processing machine (e.g., only the source/client processing machine where the identification was changed may be able to reference the original user identification).

If the user logs on to a source/client processing machine using an original identification, changes his/her identification on the source/client processing machine to a new identification, and then remotely logs on to a different target/server processing machine (through the source/client processing machine) using the new identification, the original identification on the source/client processing machine may not be known on the target/server processing machine.

BRIEF SUMMARY

One embodiment of the disclosure is directed to a method of accepting a remote access at a target machine from a source machine. A login request may be received at the target machine from the source machine, wherein the login request includes a user identification for the target machine. Responsive to accepting the login request, a session may be provided between the source and target machines using the user identification for the target machine. A user identification for the source machine may be received, and the user identification for the source machine may be locked at the target machine so that the user identification for the source machine is associated with target machine actions relating to the session between the source and target machines.

By locking the user identification for the source machine at the target machine, the user (associated with the user identification for the source machine) may be prevented from changing the user identification for the source machine at the target machine during the session. Accordingly, the user identification for the source machine may be used by the target machine throughout the session. The user identification for the source machine may thus be used by/at an interception point of the target machine throughout the session. Locking the user identification for the source machine may thus include preventing modification of the user identification for the source machine at the target machine throughout the session.

In a further embodiment, a method of providing remote login from a source machine to a target machine from the source machine may include transmitting a login request from the source machine to the target machine, wherein the login request includes a user identification for the target machine. A session may be provided between the source and target machines using the user identification for the target machine, and a user identification for the source machine may be transmitted over the session to the target machine, wherein the user identification for the target machine and the user identification for the source machine are different.

Moreover, an environment variable may be set at the source machine with the user identification for the source machine, and the source machine (e.g., a security agent thereof) may prevent a user of the source machine from updating/changing the user identification set in the environment variable.

In another embodiment, a computer program product may include a tangible computer readable storage medium comprising computer readable program code embodied in the medium that when executed by a processor causes the processor to perform operations to accept a remote access at a target machine from a source machine. More particularly, the computer readable program code when executed by the processor may cause the processor to: receive a login request at the target machine from the source machine, wherein the login request includes a user identification for the target machine; provide a session between the source and target machines using the user identification for the target machine responsive to accepting the login request; receive a user identification for the source machine; and lock the user identification for the source machine at the target machine so that the user identification for the source machine is associated with target machine actions relating to the session between the source and target machines.

In still another embodiment, a target machine may accept a remote access from a source machine. The target machine may include a processor circuit, and a memory coupled to the processor circuit and comprising computer readable program code embodied in the memory that when executed by the processor causes the processor to perform operations comprising: receiving a login request at the target machine from the source machine, wherein the login request includes a user identification for the target machine; providing a session between the source and target machines using the user identification for the target machine responsive to accepting the login request; receiving a user identification for the source machine; and locking the user identification for the source machine at the target machine so that the user identification for the source machine is associated with target machine actions relating to the session between the source and target machines.

In yet another embodiment, a computer program product may include a tangible computer readable storage medium comprising computer readable program code embodied in the medium that when executed by a processor causes the processor to perform operations to provide remote login from a source machine to a target machine from the source machine. More particularly, the computer readable program code when executed by the processor may cause the processor to: transmit a login request from the source machine to the target machine, wherein the login request includes a user identification for the target machine; provide a session between the source and target machines using the user identification for the target machine; and transmit a user identification for the source machine over the session to the target machine, wherein the user identification for the target machine and the user identification for the source machine are different.

In still a further embodiment, a source machine may provide a remote login to a target machine. The source machine may include a processor circuit, and a memory coupled to the processor circuit and comprising computer readable program code embodied in the memory that when executed by the processor causes the processor to perform operations comprising: transmitting a login request from the source machine to the target machine, wherein the login request includes a user identification for the target machine; providing a session between the source and target machines using the user identification for the target machine; and transmitting a user identification for the source machine over the session to the target machine, wherein the user identification for the target machine and the user identification for the source machine are different.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims.

BRIEF DESCRIPTION OF THE DRAWINGS

Features of examples of embodiments will be more readily understood from the following detailed description of specific embodiments thereof when read in conjunction with the accompanying drawings, in which.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

Figure 1:
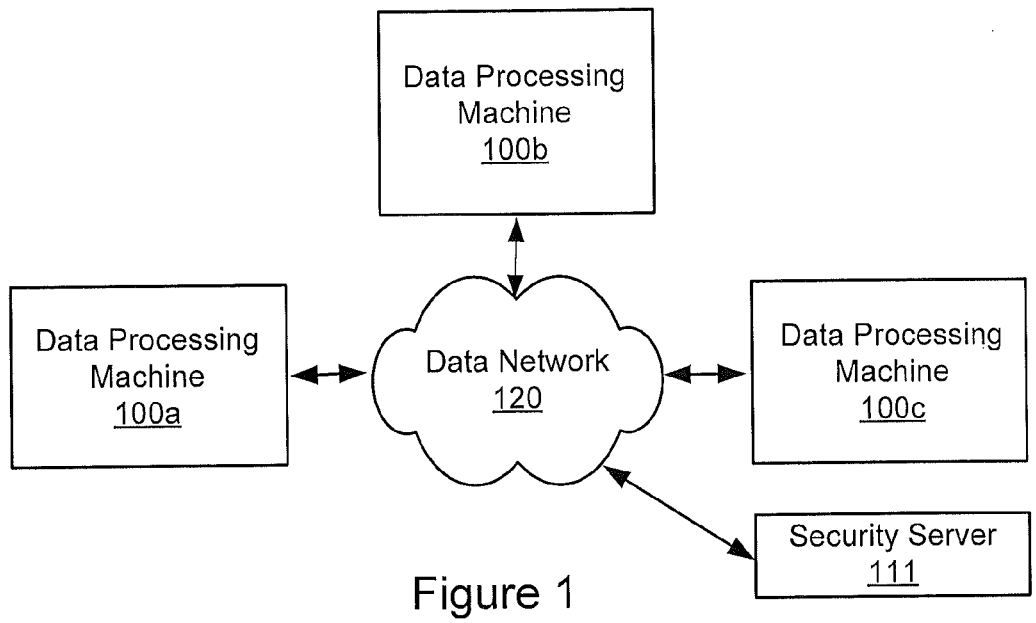
FIG. 1 is a block diagram illustrating a processing system including a plurality of remote processing machines coupled over a network according to some embodiments of inventive concepts.

FIG. 1 illustrates an example data processing system that includes a plurality of data processing machines 100a, 100b, and 100c (also referred to as data processing nodes, machines, nodes, etc.) and a security server 111 (also referred to as a security node) that are communicatively connected by one or more data networks 120. Any number of data processing machines 100, security servers 111, and data networks 120 may be included in the data processing system. Each data processing machine 100 may include locally attached data memory containing data units that can be operated upon by a processor circuit. The data memory may, for example, reside on a same substrate as the processor circuit, reside within a same integrated circuit package as the processor circuit, be connected to the processor circuit through a dedicated memory bus, and/or be connected to the processor circuit through a shared backplane bus of a printed circuit board to which the data memory and the processor circuit are fixedly or removably connected. The data network(s) 120 may include a personal area network (e.g., USB or Firewire network), a local area network (e.g., IEEE 802.11), a storage area network, a metropolitan area network, a wide area network, and/or other public (e.g., Internet) and/or private networks.

Figure 2:
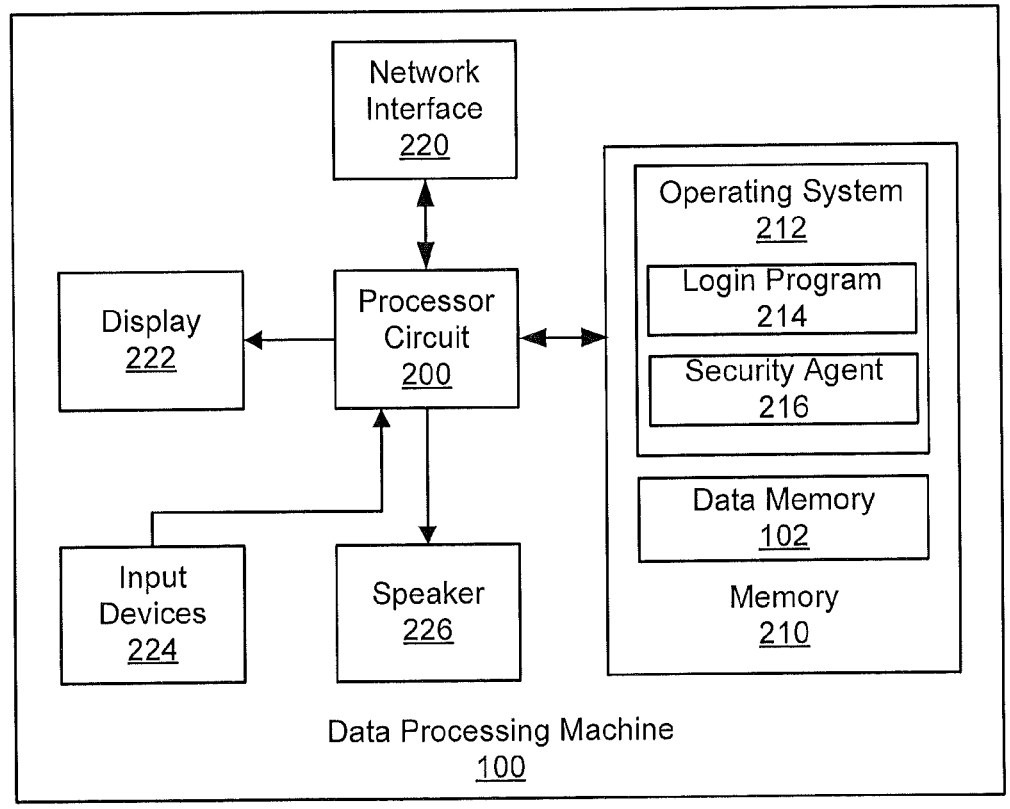
FIG. 2 is a block diagram illustrating a processing machine of FIG. 1.

FIG. 2 illustrates example components of a data processing machine 100 of FIG. 1. Each data processing machine 100 may include a processor circuit 200, a network interface 220 configured to communicate through the data network 120, and a memory 210 that includes the data memory 102. The processor circuit 200 may include one or more data processing circuits, such as a general purpose and/or special purpose processor (e.g., microprocessor and/or digital signal processor). The processor circuit 200 is configured to execute instructions (i.e., program code) from the memory 210, described below as a computer readable medium, to perform some or all of the operations that are described as being performed by the data processing node 100 according to one or more embodiments disclosed herein. The memory 210 may represent a hierarchy of memory that may include volatile and/or non-volatile memory devices, such as electronic flash memory devices, magnetic disk drives, and/or optical disk drives. The memory 210 can further include an operating system 212 that includes a login program 214 and security agent 216 as discussed in greater detail below. The data processing node 100 may include a display device 222, user/machine input device(s) 224 (e.g., keyboard, touch sensitive display interface, voice recognition, etc.), and/or a speaker device 226. Structures/blocks of FIG. 2 may apply to each of processing machines 100a, 100b, and 100c of FIG. 1, with "a" being added to the reference numbers of FIG. 2 when referring to structures/blocks of processing machine 100a, with "b" being added to the reference numbers of FIG. 2 when referring to structures/blocks of processing machine 100b, and with "c" being added to the reference numbers of FIG. 2 when referring to structures/blocks of processing machine 100c, As discussed in greater detail below, a first data processing machine 100a may operate as a source data processing machine (also referred to as a source machine, a client machine, a source/client machine, a source/client data processing machine, etc.) supporting a remote session with a second data processing machine 100b operating as a target data processing machine (also referred to as a target machine, a server machine, a target/server machine, a target/server data processing machine, etc.). Target machine 100b may thus provide service through network 120 to a user of source machine 100a over a session between source and target machines 100a and 100b. Moreover, the session may be initiated by the user remotely logging on to target machine 100b through source machine 100a and network 120. In addition, a second remote session may be supported between target machine 100b and another data processing machine 100c acting as a second target machine. Target machine 100c may thus provide service through network 120 and first target machine 100b to the user of source machine 100a over a session between source and target machines 100a and 100b and between target machines 100*b* and 100*c*. Moreover, the session may be initiated by the user remotely logging on to target machine 100*c* through source machine 100*a*, network 120, and target machine 100*b*.

According to some embodiments of inventive concepts, an original user identification (e.g., the identification used to log on to source machine 100*a*) on UNIX systems may be tracked on a remote target machine even when a user changes identifications while logging on to the remote target machine(s) 100*b*/100*c* from source machine 100*a*. The target machine 100*b*/100*c* can thus use the original user identification (i.e., the user identification used to log on to source machine 100*a*) to generate a target machine audit trail identifying all actions at target machine 100*b* occurring for the session with source machine 100*a*, and/or to determine authorization for actions at target machine 100*b* occurring for the session with source machine 100*a*. Knowledge of the original user identification at a target machine may be useful, for example, when the new identification used on the target machine is privileged (e.g., a root identification), or even if the new identification used on the target machine is a regular identification.

The transmission of identifications between source and target machines 100*a* and 100*b* may be accomplished in a secured way so that the user cannot alter the information (e.g., the original user identification) so that the original user identification is not hidden or changed when logging on to a target machine, and so that the user can continue using regular methods to get from the source machine 100*a* to one or more target machines 100*b* and/or 100*c*. According to some embodiments, security agents 216*a* and 216*b* may run on respective source and target machines 100*a* and 100*b* (transparent to the user) so that the user is unaware that the security agent is there and so that current work procedures may be unaffected. An independent security node 111 (remote from the source/target machines) may provide authentication for the security agents 216*a* and 216*b* at the source and target machines 100*a* and 100*b* so that the target machine 100*b* may obtain independent authentication of information received from the source machine 100*a* and vice versa.

A chain of login identifications may be used when logging on from a UNIX source machine 100*a* to one or more UNIX target machines 100*b* and/or 100*c* in a UNIX system. For example, a user may first log on to UNIX source machine 100*a* using a first user identification (e.g., "John"). From UNIX source machine 100*a*, the user may log on to UNIX target machine 100*b* using a second user identification (e.g., "Mary"), From UNIX target machine 100*b*, the user may log on to UNIX target machine 100*c* using a third user identification (e.g., different than John and different than Mary). When logging on to a remote target machine 100*b* and/or 100*c*, the user may change to a different user identification, for example, because the original identification (used to log on to source machine 100*a*) does not exist on target machine 100*b* and/or 100*c*, and/or because a different identification is needed for some actions to be performed by the user on target machine 100*b* and/or 100*c*.

If a different identification (e.g., "Mary") is used to log on to target machine 100*b* and/or 100*c* (i.e., an identification different than the original identification of the same user used to log on to source machine 100*a*), the original identification (e.g., "John") of the user (used to log on to source machine 100*a*) may be unknown at the target machine. By providing the original identification (used to log on to source machine 100*a*) to the target machine 100*b* and/or 100*b* (even when a different identification is used to log on to target machine 100*b* and/or 100*c*), the original identification (e.g., "John") can be used for compliance audits (i.e., to track actions at target machine 100*b* and/or 100*c* to the original user identification) and/or to provide more precise authorization so that access rights at target machine 100*b* and/or 100*c* may change depending on the original user identification (e.g., "John").

Figure 3:
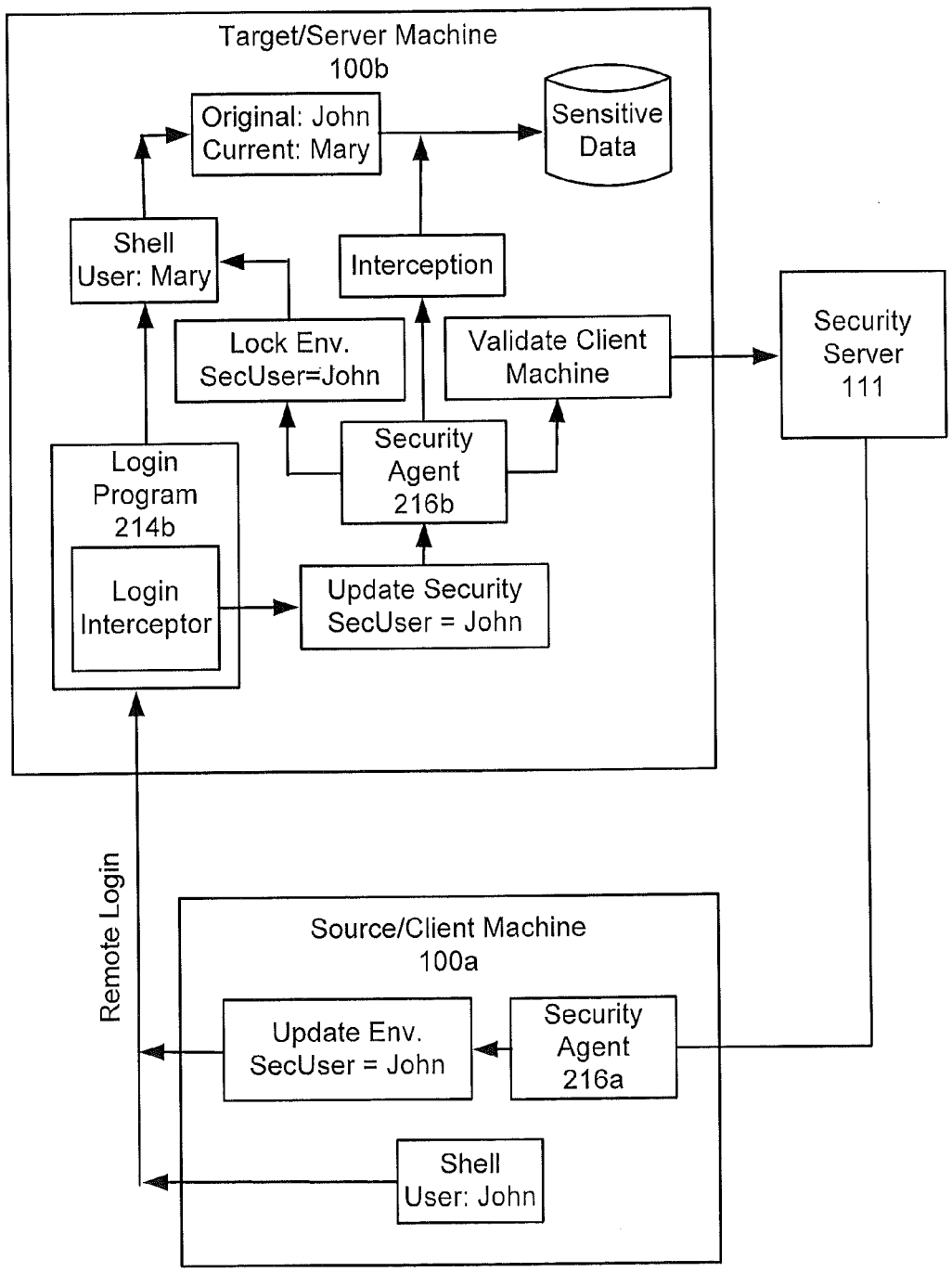
FIG. 3 is a schematic diagram illustrating functionalities/operations of source/client machine, target/server machine, and security server of FIGS. 1 and 2.

FIG. 3 is a schematic diagram illustrating functionalities/operations of source/client machine 100*a*, target/server machine 100*b*, and security server 111. As shown in FIG. 3, when a user logs in from UNIX source machine 100*a* to UNIX target machine 100*b*, local security agent 216*a* on source machine 100*a* may set up a special environment variable including the original identification (e.g., "John") used by the user to log on to source machine 100*a*. This identification may be transferred during remote login over network 120 to UNIX target machine 100*b* through the user's login program (e.g., ssh), and at target machine 100*b*, the identification is taken from the environment by security agent 216*b* (at the target machine 100*b*) during login and saved under the current user session so that the original identification (e.g., "John") is visible/available for security evaluation by security agent (e.g., using ControlMinder/CM or similar security products) at target machine 100*b*.

At source/client machine 100*a*, security agent 216*a* keeps track of the original user identification used to log on to source machine 100*a* (e.g., CM or another security product may know to track the original identification and any new identifications used for remote login/logins using surrogate, setuid, or set user identification programs). Security agent 216*a* may also set an environment variable with the original identification (e.g., John) and may prevent the user from updating/changing the original identification included in the environment variable. Security agent 216*a* can also intercept running of the login client (i.e. ssh) used for remote login (e.g., to log on to remote target/server device 100*b*), and a pre-handler of login program 214*a* may update the environment variable with the original identification used to log on to the source/client machine 100*a*. Moreover, login program 214*a* may be set up to move this environment variable (including the original identification) between the source/client machine 100*a* and the target/server machine 100*b* (over network 120) when using a different identification (e.g., "Mary") to remotely log on to the target machine 100*b*.

The environment variable may thus be set at source/client machine 100*a* (by security agent 216*a*) with the original identification for source/client machine 100*a*. Security agent 216*a* of source/client machine 100*a* may thus prevent a user of source/client machine 100*a* from updating/changing the user identification set in the environment variable.

On target machine 100*b*, the environment variable including the original identification (used for login at source machine 100*a*) may be protected from change. A login interceptor may pick the original identification (also referred to as a value) from the session during authentication/login time and put this inside the run time table of the security agent 216*b* under the session information (as detected from the pid or process identification). When the user performs an activity/operation that requires security evaluation, both original and target identifications may be checked for the authorization decision. The original identification of the user can also be queried by the user or security administrator, and used both for authorization and audit/reporting.

By locking the original identification (used for login at source machine 100*a*) at the target machine, the user (associated with the user identification for the source machine) may be prevented from changing the original identification at the target machine during the session. Accordingly, the original identification may be used by the target machine throughout the session. The original identification for the source machine may thus be used by/at an interception point of the target machine throughout the session. Locking the original identification may thus include preventing modification of the original identification at the target machine throughout an entirety of the session.

On client machine 100a, security agent 216a may be responsible for updating the environment variable with the current/original security identification of a user. When the user remotely logs on to a different machine (e.g., target machine 100b) using a different identification, security agent 216a may make sure that the environment variable is current (including the original identification used to log on to source machine 100a), update the environment variable if needed, and make sure source machine 100a is set up to move the environment variable.

On target machine 100b, security agent 216b receives the original user identification during login (from the login interception module of login program 214b) and updates its internal tables with the session and original identification. When the user tries to access secured resources, security evaluation performed by security agent 216b can use the original identification (used to log on to source machine 100a) of the user instead of or in addition to the current identification (used to log on to target machine 100b), and security agent 216b can record both original and current identification for the audit trail.

The environment variable may be signed using a known secret shared between source and target machines 100a and 100b (e.g., coordinated, verified, and/or validated using security server 111). By using independent security server 111 to verify/validate the environment variable, a risk of a user forging/changing the environment variable while information is passed through the network may be reduced.

During login according to some embodiments, login interceptor of login program 214b may connect to source machine 100a and/or security server 111 to make sure source machine 100a is protected. If login interceptor connects to source machine 100a, then it checks the environment variable for the original identification (used to log on to source machine 100a) and notifies security agent 216b to update its tables for the session to include the original identification (also referred to as the source identification which is used to log on to source machine 100a) and the current identification (used to log on to the target machine 100b).

Security agent 216b on target machine 100b can thus know the original identification of the user on source machine 100a (used to log on to source machine 100a), and security agent 216b can take original identification into account when evaluating security actions, and/or when monitoring the activity so that this information (the original identification) can be included in the audit trail. Forwarding of the original identification in an environment variable is not limited to a chain of login from one source machine to one target machine, and the original identification can also be used when using ssh from the target machine 100b to log on to another target machine 100c.

According to some embodiments, user activity tracking can be based on the original user identification when moving between systems with a chain of logins using different identifications. Moreover, login to a system can be restricted based on the original user identification on the source machine 100a. Decisions regarding security events (such as access to sensitive/restricted files and/or performance of sensitive/restricted operations) at target machine 100b and/or 100c can be made considering (based on) the original user identification of source machine 100a as well as the different identification(s) used to log on to the target machine(s). Methods/operations of login from one system to the other may not change substantially, and/or regular user procedures may not change (including automated actions) substantially.

Figure 4:
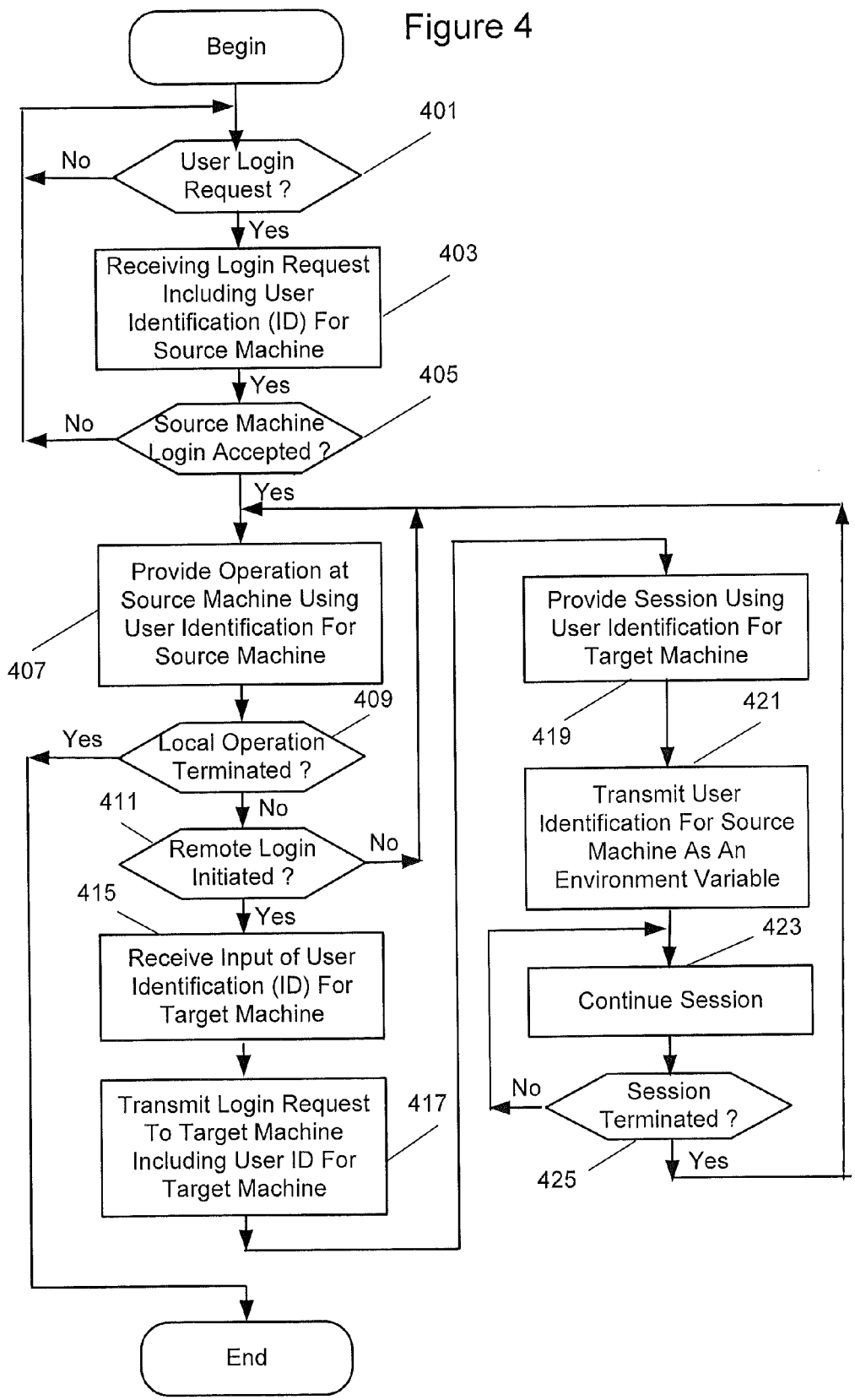
FIG. 4 is flow chart illustrating operations of a source data processing machine (also referred to as a source machine, a source/client data processing machine, a client machine, a client data processing machine, etc.)

Operations of source machine 100a (e.g., a UNIX client machine) according to some embodiments will now be discussed in greater detail below with respect to the flow chart of FIG. 4 illustrating operations of providing remote login from source machine 100a to target machine 100b (e.g., a UNIX server machine). At block 401, processor circuit 200a may wait until a local login request is initiated, and at block 403, processor circuit 200a may receive user input of a source machine login request (e.g., responsive to user input through input device/devices 224) including a user identification for the source machine (also referred to as an original identification, an original identification for the source machine, a source identification, a login identification for the source machine, etc.). Responsive to accepting the source machine login request at block 405, processor circuit 200a may provide operation at source machine 100a using the user identification for the source machine at block 407. Processor circuit 200a may accept or reject the login request based on the user identification for the source machine. In addition, receiving the login request may include receiving a user authentication (e.g., a password) for the source machine (different than the user identification for the source machine), and acceptance/rejection of the login request may be based on both the user identification and authentication. Processor circuit 200a may continuing providing operation at source machine 100a using the user identification for the source machine as long as local operation is not terminated at block 409.

If/when a remote login for target machine 100b (e.g., a UNIX server machine) is initiated at block 411 (while providing operation at source machine 100a using the user identification of the source machine), processor circuit 200a of source machine 100a may receive input of a user identification for target machine 100b (an identification for the target machine, a target identification, a login identification for the target machine, etc.) at block 415 (different than the user identification for source machine 100a). According to embodiments discussed above, for example, a user identification for source machine 100a may be "John", a user identification for target machine 100b may be "Mary", and the different user identifications for source and target machines 100a and 100b may be associated with a same user. In addition, processor circuit 200a of source machine 100a may receive input of a user authentication (e.g., a password) for target machine 100b.

At block 417, processor circuit 200a may transmit a remote login request through network interface 220a and network 120 to target machine 100b (while providing operation at source machine 100a using the user identification of the source machine), with the login request including the user identification for the target machine 100b and the user authentication for target machine 100b. As long as target machine 100b accepts the remote login request (e.g., based on the user identification and/or the user authentication for target machine 100b), processor circuit 100a and network interface 220a of source machine 100a may provide a session between source and target machines 100a and 100b using the user identification for target machine 100b at block 419. At block 421, processor circuit 200a may also transmit the user identification for the source machine over the session (through network interface 220a and network 120) to target machine 100b, with the user identification for the target machine and the user identification for the source machine being different. More particularly, the user identification for the source machine may be included as a UNIX environment variable that is transmitted from source machine 100a to target machine 100b as an environment variable of a UNIX environment.

While block 421 is shown separate from block 417, operations of block 421 may be included in block 417, and/or target machine 100b may accept/reject the remote login request based on the original user identification for the source machine and the current user identification for the target machine. Moreover, the target machine 100b may accept/reject the remote login request based on the original user identification for the source machine, the current user identification for the target machine, and the current authentication (e.g., password) for the target machine.

Operations of the remote session between source and target machines 100a and 100b may continue at block 423, for example, until the remote session is terminated at block 425 or local operation of source machine 100a are terminated at block 409.

Figure 5:
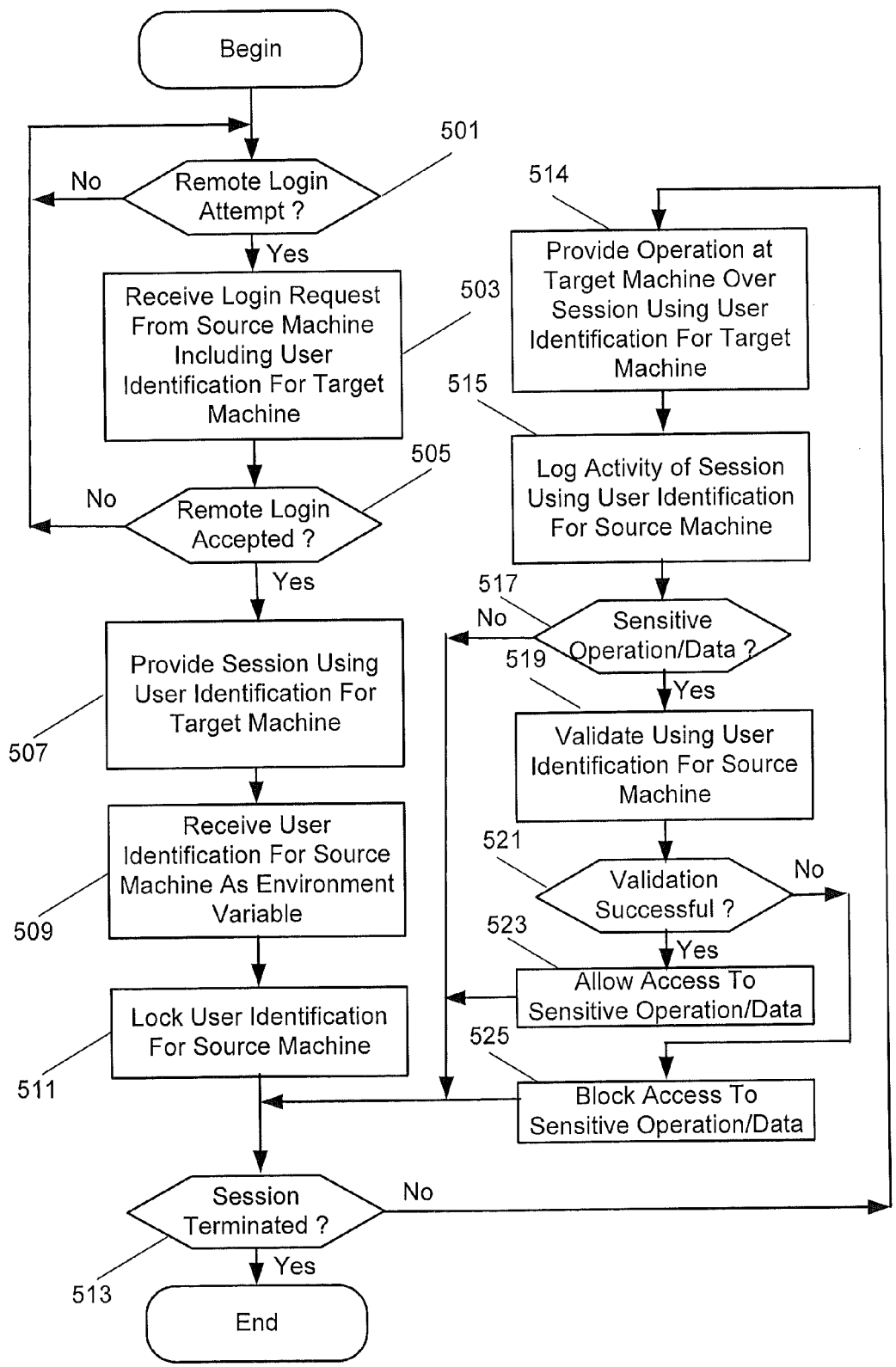
FIG. 5 is flow chart illustrating operations of a target data processing machine (also referred to as a target machine, a target/server data processing machine, a target machine, a target data processing machine, etc.)

Operations of target machine 100b (e.g., a UNIX server machine) according to some embodiments will now be discussed in greater detail below with respect to the flow chart of FIG. 5 illustrating operations of accepting a remote login at target machine 100b from source machine 100a (e.g., UNIX client machine). If/when a remote login from source machine 100a is attempted for target machine 100b at block 501, processor circuit 200b may receive a login request from source machine 100a through network interface 220b at block 503, with the login request including a user identification for target machine 100b (e.g., a login identification for the target machine). Responsive to accepting the login request at block 505, processor circuit 200b may provide a session between source and target machines 100a and 100b at block 507 using the user identification for target machine 100b.

In addition, the login request may include a user authentication (e.g., a password) for target machine 100b, with the user identification and the user authentication for target machine 100b being different. Accordingly, processor circuit 200b may accept/reject the login request based on the user identification and the user authentication for target machine 100b.

At block 509, processor circuit 200b may receive a user identification for the source machine (e.g., a login identification for the source machine 100a) through network interface 220b. For example, the user identification for the source machine 100a may be received over the session as an environment variable of an environment defined at the source machine 100a (e.g., as a UNIX environment variable). At block 511, processor circuit 200b may lock the user identification for the source machine 100a at the target machine 100b so that the user identification for the source machine 100a is associated with target machine actions relating to the session between the source and target machines. Operations of the remote session may continue at block 513 until the session is terminated at block 513. While block 509 is shown after block 503, according to some embodiments, the user identification for the source machine may be received at block 503 with the login request.

At block 514, processor circuit 200b may provide operation at target machine 100b over the session (provided at block 507) using the user identification for target machine 100b. As further discussed with respect to blocks 514, 515, 517, 521, 523, and 525, processor circuit 200b may use the user identification for the source machine to log operations of the session and/or to allow/block sensitive operations by the user during the remote session.

At block 515, processor circuit 200b may log activity of the session at target machine 100b using the user identification for source machine 100a. According to some embodiments, processor circuit 200b may log activity using both the user identification of target machine 100b and the user identification of source machine 100a.

Responsive to a request over the session for access to sensitive data and/or a request for a sensitive operation at target machine 100b at block 517, processor circuit 200b may validate the request using the user identification for the source machine at block 519. According to some embodiments, validation may be performed using the user identification for target machine 100b and the user identification for source machine 100a. Responsive to successfully validating the request for sensitive data/operation at block 521, processor circuit 200b may allow access to the sensitive data and/or the sensitive operation at block 523. Responsive to failure validating the request for sensitive data/operation at block 521, processor circuit 200b may block access to the sensitive data and/or the sensitive operation at block 525. As noted above, the remote session may continue at target machine 100b until terminated at block 513.

Figure 6:
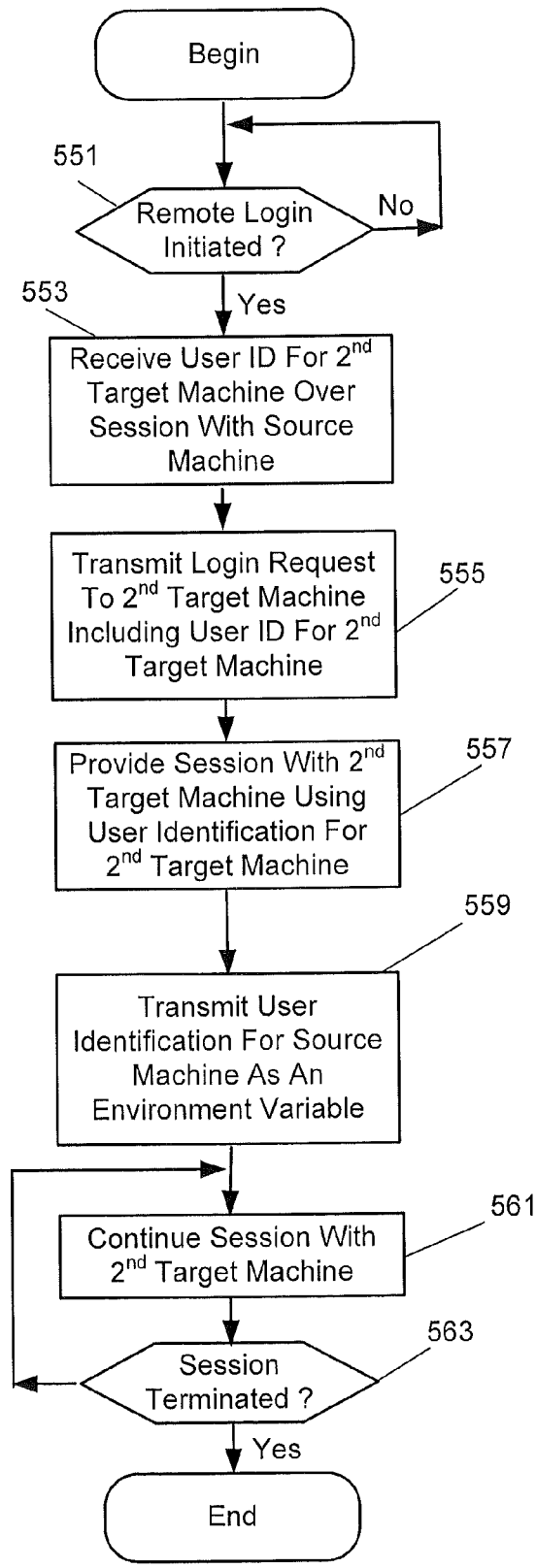
FIG. 6 is flow chart illustrating additional operations of a target data processing machine (also referred to as a target machine, a target/server data processing machine, a target machine, a target data processing machine, etc.).

As discussed above with respect to FIGS. 4 and 5, a remote session can be provided between source and target machines 100a and 100b. As discussed blow with respect to FIG. 6, a second remote session may be established at a second target machine 100c for the user of source machine 100a through network 120 and through first target machine 100b. For example, the remote session between source and target machines 100a and 100b discussed above with respect to FIGS. 4 and 5 may be used to establish a second remote session between target machines 100b and 100c so that user access to target machine 100c is provided through source machine 100a, target machine 100b, and network 120.

After establishing the session between source machine 100a and target machine 100b, the user may initiate a remote login at block 551 through source machine 100a and target machine 100b at block 551. At block 553, processor circuit 200b may receive a user identification for target machine 100c (through network 120 and network interface 220b) from source machine 100a over the session with source machine 100a. At block 555, processor 100b may transmit a login request through network interface 220b to target machine 100c, with the login request including the user identification for target machine 100c. According to some embodiments, processor circuit 200b may receive the user identification for target machine 100c and a user authentication (e.g., password) for target machine 100c, and the login request of block 555 may include the user identification and authentication for target machine 100c. Accordingly, target machine 100c may use the user identification and/or the user authentication for target machine 100c to accept/reject the login request.

Responsive to target machine 100c accepting the login request, processor circuit 200b may providing a session between target machines 100b and 100c using the user identification for target machine 100c. This session between target machines 100b and 100c together with the session between source machine 100a and target machine 100b may allow the user of source machine 100a access to operations/data at target machine 100c. At block 559, processor circuit 200b may transmit the user identification for the source machine 100a over the session (through network interface 120b and network 120) to target machine 100c, with the user identification for source machine 100a and the user identification for target machine 100b being different, and with the user identification for target machine 100b and the user identification for target machine 100c being different. Processor circuit 200b may continue operations of the session with target machine 100c at block 561 until the session with target machine 100c is terminated at block 563.

Operations of providing the second session at target machine 100c may substantially the same as or similar to those discussed above with respect to FIG. 5 providing the first session at target machine 100b. Processor circuit 200c of target machine 100c may thus use the user identification for source machine 100a to log activity of the second session and/or to allow/block access to sensitive operations/data of the second session. Accordingly, an original user identification for source machine 100a may be provided at every target machine (e.g., target machines 100b and 100c) in a chain of target machines used in a chain of sessions for the user of source machine 100a (even when a different user identification is used for each source and target machine in the chain).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a buffered repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer implemented method of accepting a remote access at a target machine from a source machine, wherein the source machine is remote from the target machine, and wherein the source and target machines are coupled over a network, the method comprising:
   receiving a login request at a processor circuit of the target machine through a network interface of the target machine from the source machine over the network, wherein the login request includes a user identification for the target machine;
   responsive to accepting the login request, providing at the processor circuit of the target machine a session through the network interface over the network between the source and target machines using the user identification for the target machine;
   receiving from the source machine a user identification for the source machine at the processor circuit of the target machine through the network interface over the network,
     wherein the user identifications for the source and target machines are different,
     wherein the user identification for the target machine comprises a login identification to the target machine, and
     wherein the user identification for the source machine comprises a login identification to the source machine; and
   locking the user identification for the source machine at the processor circuit of the target machine so that the user identification for the source machine is associated with actions of the target machine relating to the session between the source and target machines,
   wherein the target machine comprises a first target machine and the session comprises a first session, the method further comprising:
   transmitting from the processor circuit through the network interface over the network a second login request to a second target machine from the first target machine, wherein the second login request includes a user identification for the second target machine, wherein the first target machine is remote from the second target machine, and wherein the first and second target machines are coupled over the network;
   providing at the processor circuit through the network interface a second session over the network between the first and second target machines using the user identification for the second target machine; and
   transmitting from the processor circuit through the network interface the user identification for the source machine over the second session to the second target machine, wherein the user identification for the source machine and the user identification for the first target machine are different, wherein the user identification for the first target machine and the user identification for the second target machine are different, and wherein the user identification for the source machine and the user identification for the second target machine are different.

2. The computer implemented method according to claim 1 wherein receiving the user identification for the source machine comprises receiving the login identification for the source machine at the processor circuit of the target machine through the network interface over the session as an environment variable of an environment defined at the source machine.

3. The computer implemented method according to claim 2 wherein the environment variable comprises a Unix environment variable of a Unix environment defined at the source machine.

4. The computer implemented method according to claim 2 wherein the login request further includes a user authentication for the target machine wherein the user authentication and the user identification for the target machine are different.

5. The computer implemented method according to claim 2 further comprising:
   logging activity of the session at the processor circuit of the target machine using the user identification for the source machine.

6. The computer implemented method according to claim 2 further comprising:
   responsive to an access request over the session for access to sensitive data, validating the access request at the processor circuit of the target machine using the user identification for the source machine.

7. The computer implemented method according to claim 6 further comprising:
   responsive to successfully validating the access request, allowing at the processor circuit of the target machine access to the sensitive data.

8. The computer implemented method according to claim 6 further comprising:
   responsive to failure validating the access request, blocking at the processor circuit of the target machine access to the sensitive data.

9. The computer implemented method of claim 2 wherein the target machine is a server target machine and wherein the source machine is a client source machine.

10. The computer implemented method of claim 9 wherein the server target machine is a Unix server target machine, and wherein the client source machine is a Unix client source machine.

11. The computer implemented method according to claim 2 further comprising:
   responsive to a request for a sensitive operation at the target machine, validating the operation request at the processor circuit using the user identification for the source machine.

12. The computer implemented method according to claim 2 wherein the user identification for the source machine and the user identification for the target machine are associated with a same user, and wherein the environment variable is signed using a secret shared between the source and target machines.

13. The computer implemented method according to claim 1, wherein receiving the user identification for the source machine comprises receiving the login identification to the source machine at the processor circuit through the network interface over the first session as a first Unix environment variable of a Unix environment defined at the source machine, and wherein transmitting the user identification for the source machine over the second session comprises transmitting a second Unix environment variable including the login identification to the source machine from the processor circuit through the network interface over the second session.

14. A computer implemented method of providing remote login from a source machine to a target machine from the source machine, wherein the source machine is remote from the target machine, and wherein the source and target machines are coupled over a network, the method comprising:
   transmitting a login request from a processor circuit of the source machine through a network interface of the source machine to the target machine over the network, wherein the login request includes a user identification for the target machine;
   providing at the processor circuit of the source machine a session through the network interface over the network between the source and target machines using the user identification for the target machine;
   transmitting from the processor circuit of the source machine through the network interface and the network a user identification for the source machine over the session to the target machine, wherein the user identification for the target machine and the user identification for the source machine are different, wherein the user identification for the target machine comprises a login identification to the target machine, and wherein the user identification for the source machine comprises a login identification to the source machine; and
   locking the user identification for the source machine at the target machine so that the user identification for the source machine is associated with actions of the target machine relating to the session between the source and target machines,
   wherein the target machine comprises a first target machine and the session comprises a first session, the method further comprising:
   transmitting over the network a second login request to a second target machine from the first target machine, wherein the second login request includes a user identification for the second target machine, wherein the first target machine is remote from the second target machine, and wherein the first and second target machines are coupled over the network;
   providing a second session over the network between the first and second target machines using the user identification for the second target machine; and
   transmitting the user identification for the source machine over the second session to the second target machine, wherein the user identification for the source machine and the user identification for the first target machine are different, wherein the user identification for the first target machine and the user identification for the second target machine are different, and wherein the user identification for the source machine and the user identification for the second target machine are different.

15. The computer implemented method according to claim 14 wherein transmitting the user identification for the source machine comprises transmitting an environment variable of an environment defined at the source machine including the login identification for the source machine from the processor circuit through the network interface over the session.

16. The computer implemented method according to claim 15 wherein the environment variable comprises a Unix environment variable of a Unix environment defined at the source machine.

17. The computer implemented method according to claim 15 further comprising:
   receiving at the processor circuit a source machine login request including the user identification for the source machine; and
   responsive to accepting the source machine login request, providing at the processor circuit operation at the source machine using the user identification for the source machine;
   wherein transmitting the login request to the target machine comprises transmitting the login request from the processor circuit through the network interface to the target machine responsive to user input at the source machine while providing the operation at the source machine.

18. The computer implemented method according to claim 15 wherein transmitting the login request is preceded by receiving user input of the user identification for the target machine and receiving user input of a user authentication for the target machine, and wherein transmitting the login request comprises transmitting the login request including the user authentication for the target machine.

19. The computer implemented method according to claim 15 wherein the source machine is a client source machine and the target machine is a server target machine.

20. The computer implemented method according to claim 19 wherein the server target machine is a Unix server target machine, and wherein, the client source machine is a Unix client source machine.

21. The computer implemented method according to claim 15 wherein the user identification for the source machine and the user identification for the target machine are associated with a same user, and wherein the environment variable is signed using a secret shared between the source and target machines.

22. A computer implemented method of accepting a remote access at a target machine from a source machine, wherein the source machine is remote from the target machine, and wherein the source and target machines are coupled over a network, the method comprising:
   receiving a login request at a processor circuit of the target machine through a network interface of the target machine from the source machine over the network, wherein the login request includes a user identification for the target machine;

responsive to accepting the login request, providing at the processor circuit of the target machine a session through the network interface over the network between the source and target machines using the user identification for the target machine;

receiving from the source machine a user identification for the source machine at the processor circuit of the target machine through the network interface over the network, wherein the user identifications for the source and target machines are different, wherein the user identification for the target machine comprises a login identification to the target machine, and wherein the user identification for the source machine comprises a login identification to the source machine;

associating, by the processor circuit of the target machine, the user identification for the source machine with the session between the source and target machines throughout the session;

preventing, by the processor circuit of the target machine, a modification of the user identification for the source machine associated with the session between the source and target machines throughout an entirety of the session;

receiving at the processor circuit of the target machine over the session an access request to sensitive data; and responsive to the access request to sensitive data, validating the access request at the processor circuit of the target machine using the user identification for the source machine, wherein the target machine comprises a first target machine and the session comprises a first session, the method further comprising:

transmitting from the processor circuit through the network interface over the network a second login request to a second target machine from the first target machine, wherein the second login request includes a user identification for the second target machine, wherein the first target machine is remote from the second target machine, and wherein the first and second target machines are coupled over the network;

providing at the processor circuit through the network interface a second session over the network between the first and second target machines using the user identification for the second target machine; and transmitting from the processor circuit through the network interface the user identification for the source machine over the second session to the second target machine, wherein the user identification for the source machine and the user identification for the first target machine are different, wherein the user identification for the first target machine and the user identification for the second target machine are different, and wherein the user identification for the source machine and the user identification for the second target machine are different.

23. The computer implemented method according to claim 22, wherein validating the access request at the processor circuit of the target machine comprises using the user identification for the source machine instead of the user identification for the target machine.

24. The computer implemented method according to claim 22 wherein receiving the user identification for the source machine comprises receiving the login identification for the source machine at the processor circuit of the target machine through the network interface over the session as an environment variable of an environment defined at the source machine.

25. The computer implemented method according to claim 24 wherein the user identification for the source machine and the user identification for the target machine are associated with a same user, and wherein the environment variable is signed using a secret shared between the source and target machines.

* * * * *